Patented Dec. 17, 1946

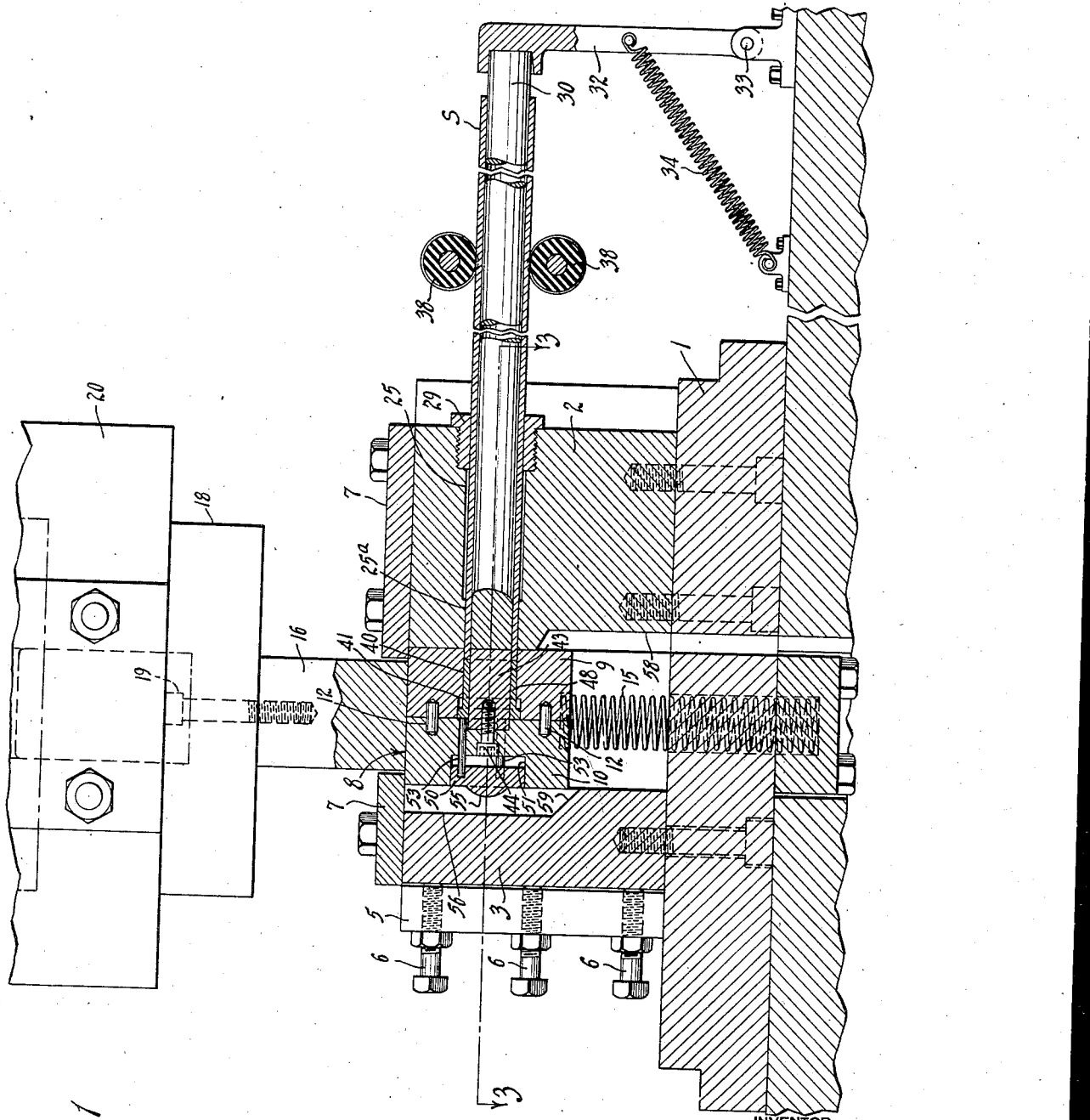

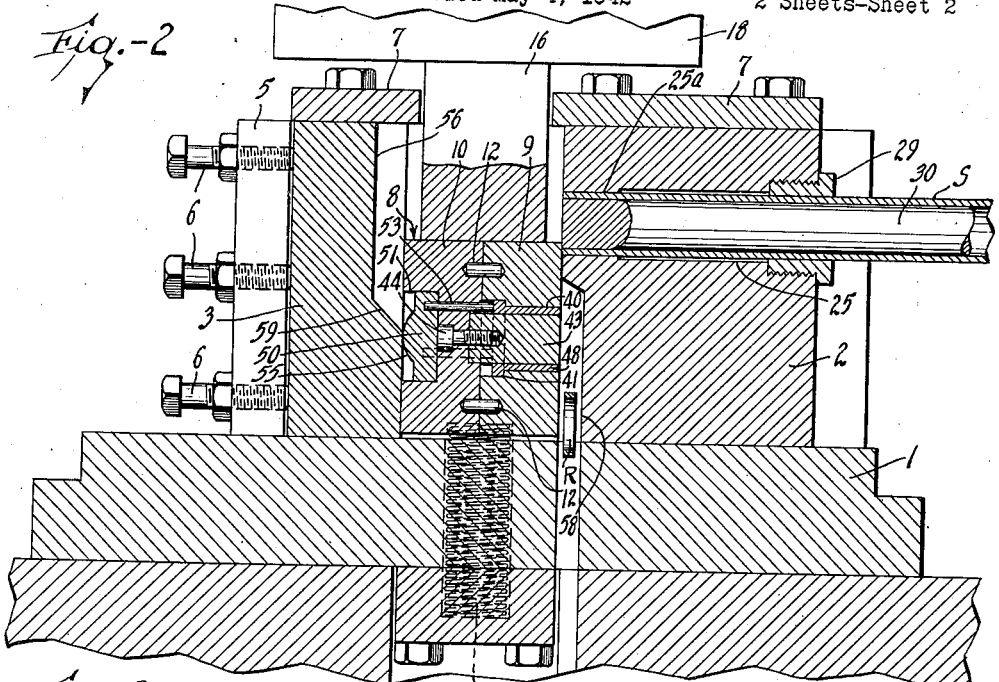

2,412,930

UNITED STATES PATENT OFFICE 2,412,930

MACHINE FOR MAKING RIFLING RINGS OR THE LIKE

Mercer D. Walklet, Akron, Ohio, assignor to The Hamlin Metal Products Company, Akron, Ohio, a corporation of Ohio Application May 4, 1942, Serial No. 441,734

11 Claims. (Cl. 164—48)

The present invention relates primarily to improved means for the manufacture of rings which are made from tubing and are used in the manufacture of shells of all types. These rings are commonly made from copper or brass tubing by sawing or cutting them from the end of a tube, but these operations are not only slow and costly, but result in the loss of a substantial amount of the stock.

By the apparatus illustrated and described herein as the preferred embodiment of the invention, these rings may be made at a much greater speed than the old methods and with greater efficiency because there is no loss of the stock. The rings are accurately made and may be produced in large quantities very rapidly and cheaply. One of the principal advantages of the machine is that by the design of the die block and the die it is possible to make rings from comparatively large tubing with great accuracy, the machine being capable of delivering finished rings of the sizes required which do not require any finishing operations to meet the most exacting specifications.

While the invention is particularly designed and intended for the purpose set forth above, it is apparent that some of the principles of the invention may be employed for the manufacture of disks or small plates and the stock may be of any cross-sectional form. It will also be evident that the machine may be modified or improved without departing from the basic principles of the invention as set forth in the appended claims.

In the drawings and description is shown the best known and preferred form of the invention as it has been perfected at the present time. The machine shown is capable of producing at least seventy-five perfect rings a minute and it will thus be seen that the manufacture of these articles is greatly improved over existing machines.

In the drawings:

Fig. 1 is a vertical section through a machine made and operated in accordance with the invention, showing the essential elements of the invention. Certain mechanical movements, such as the means for operating the press head and feeding the stock, have been omitted as any well known adaptation of mechanical movements may be employed for these portions of the machine.

Fig. 2 is a similar section through the die block, showing the apparatus at the completion of the forming stroke with a completed ring in the discharge passage.

Fig. 3 is a horizontal section on the line 3—3 of Fig. 1.

For the manufacture of rings, such as the rifling rings for shells, a tube S of copper or brass or the like is supported upon a mandrel which is rigidly supported in one section of a die block. Located in the die block is a movable die which is provided with a recess in the face adjacent the mandrel, this recess being of the depth of the finished ring R. As the die is moved into register with the stock, the tube is advanced, filling the recess in the movable die. A quick movement of the die across the face of the die block shears a ring from the end of the tube, and this ring is discharged at the end of the movement of the die, the die returning for a new charge. In the case of forming other products, such as solid disks or plates, the mandrel is omitted.

A machine for carrying out the described procedure is illustrated in the drawings.

On a base or support 1 is secured the die block which is in two parts, the part 2 being shown at the right in the drawings and constituting the stock guiding and supporting means. The other section 3, spaced from the section 2, is the backing member. The two portions of the die block are tied together by C-clamps 5 provided with adjustable setscrews 6 bearing against the section 3 so that the parts may be adjusted to take up wear, and the die block is held down against the base by cover plates 7.

Between the parts 2 and 3 of the die block is mounted the movable die, indicated generally by the numeral 8. The die consists of two sections, indicated at 9 and 10 respectively, the section 9 being in contact with the face of the die block 2 and the section 10 in contact with the face of the die block 3. These two sections are held together by dowels 12 and setscrews 13. The sectional arrangement of the die facilitates assembly and also permits the insertion of shims between the die sections to compensate for excessive wear of the die.

The die is supported by two heavy coil springs 15 and held in position against the overhanging edge of the cover plates 7. The die is moved from its uppermost position (Fig. 1) to its lower or discharge position (Fig. 2) by a plunger 16 which is movable through an opening in the space between the plates 7. The plunger 16 is connected to a crosshead 18 by a bolt or setscrew 19 which is set as shown in Fig. 1 so that there is a limited movement of the crosshead 18 on the upstroke of the press after the die reaches the upper limit of its movement. This is to allow a sufficient interval to accomplish the feeding of the stock, as will be explained.

The crosshead 18 is attached to and operated by the head 20 of any suitable press which is powerful enough in its action to shear the stock at the end of the tube.

The die block 2 is provided with a passage 25 in which the tube of stock S is fed and guided to the die. The inner end of the passage 25 is preferably reduced, as at 25ª, to fit closely around the stock, one-thousandth of an inch clearance or less being provided. The balance of the passage is cored out, but at the entrance to the passage it is advisable to provide a removable thimble or guide 29 to support the stock at a second point. Where tubular stock is to be employed for the making of rings, there is provided a mandrel 30 which fits closely within the stock with its inner end in alignment with the face of the die 9. The outer end of the mandrel is held and supported in a movable bracket 32 of any desirable form. In the drawings this consists of the pivoted bracket 32 which is rocked about the point 33 and held in its raised position by a spring 34 so that the mandrel is held at all times in alignment with the face of the die 9.

Any suitable or practical means may be provided to feed the stock forward after each article is sheared therefrom. In the form shown, this consists of two feed rolls 38 on either side of the stock. These feed rolls may be of some yielding, frictional material, such as "neoprene" or a rubber-like compound, it being essential that the feeding means grip the stock and feed it positively at the required moment. The feed rolls may be actuated directly from the press operating means by any suitable mechanism. This feeding stroke should occur during the interval permitted by the space between the crosshead 18 and the head of the screw 19 which allows the idle movement in the upstroke of the press after the die is in position. In the drive mechanism for feeding the stock, there may be a friction clutch which will permit a slight over-drive to insure positive and complete seating of the stock in its final position in the die. This feeding mechanism is not illustrated as it is no part of the present invention and many different forms of drive may be devised for this purpose.

Referring now to the movable die. The section 9 is provided with an orifice 40 which is of the same size and shape and registers with the guide 25ª when the die is in its uppermost position. This orifice is enlarged at its inner end to provide a shoulder 41. In the case of hollow stocks, such as the tube illustrated, there is provided in the die a mandrel extension 43 which is held by a setscrew 44 in the die section 10 and which projects into the tubular stock and terminates at the face of the die section 9 where it abuts the end of the mandrel 30. Surrounding the mandrel extension and slidable in the passage 40 is the ejector sleeve 48, the outer end of which is set back from the face of the die section 9 a distance equal to the thickness of the finished ring. A shoulder at the base of the sleeve 48 will strike the shoulder 41 at the end of the ejection stroke.

The sleeve 48 is moved by an ejector head 50 which is slidable in a recess 51 in the die section 10 and is provided with pins 53 which bear against the base of the ejector sleeve 48. When the parts are in position to act, the stock S has been fed by the rolls 38 so that the end of the tube projects into the cavity in the die section 9, as shown in Fig. 1, which forces the ejector sleeve and the ejector block to the left, in which position the rounded knob 55 on the ejector block 50 projects into the vertical slot or groove 56 in the die block section 3.

As the press head 20 moves downwardly, the end of the tube which projects into the die section 9 is sheared between the die block 2 and mandrel 30 and the die 9 and its mandrel extension 43. As the die moves downwardly, the severed ring, lying in the die section 9, is moved opposite a discharge groove or slot 58 in the die block 2, whereupon the knob 55 strikes the cam surface 59 at the base of the groove 56 which forces the ejector block and ejector sleeve to the right and discharges the finished ring R into the slot 58, as shown in Fig. 2.

On the return stroke, the parts reassume the position shown in Fig. 1 and the stock S is fed into the socket in the face of the die and the operation is repeated.

As the end of each piece of stock passes the feed roll 38, the mandrel holder 32 is swung downwardly, preferably until it passes the dead center, where it is held by the spring 34, and a new section of stock inserted over the mandrel.

It will be seen that a very simple and economical apparatus has been devised for the manufacture of rings, disks or the like, and while the drawings and description have been detailed, exact conformity therewith need not be practised to realize the objects of the invention. The tube is supported both inside and out at the line of shear so there is no splaying or distortion of the stock and a clear and precise shearing action is obtained. This forms a perfect ring which is equal in all respects to rings made by the older and accepted methods. The feed rolls, being formed of or faced with a yielding stock, exert a positive feeding action without marring the outside of the tube and prevent any tendency of the stock to retreat at the commencement of the shearing stroke so that the ring is of even thickness throughout. While the apparatus shown accomplishes the shearing action by moving the die which holds and confines the end of the tube relatively of the main body of the tube, this operation may be reversed, or both the die members may be moved. It is also possible to move the movable die member in any direction so long as the relative shearing action is maintained.

While the machine has been shown with a single die cavity for acting upon one piece of stock, and in one direction only, the invention may be employed in modified forms which are not limited to these details. These modifications are a matter of machine design and do not alter the essential principles of the invention.

What is claimed is:

1. In an apparatus for shearing rings from tubular metal stock, a die block comprising two sections spaced apart to provide a channel, a die fitting in the channel between the sections with its opposite faces bearing against the opposing walls of the channel, means for adjusting one of the die block sections relative to the other to take up wear between the die and the die block, a passage for the stock through one of the die block sections, a recess in the die in register with the passage in one position of the die, and means to move the die in the channel.

2. In an apparatus for shearing rings from tubular metal stock, a die block comprising two sections spaced apart to provide a channel, a die fitting in the channel between the sections and bearing against the opposing walls thereof, means for moving one of the die block sections relative to the other die block section to take up wear between the faces of the die and the die block sections, a passage for the stock through one of the die block sections, a recess in the die in register with the passage in one position of the die, an ejector housed within the die, means to move the die in the channel, and coacting formations on the ejector and a die block section to actuate the ejector when the die is moved.

3. In an apparatus for shearing the end of a length of stock, comprising a die block formed in two sections, one of said sections being provided with a passage for the stock, the other section being spaced therefrom and constituting a backing section, the opposing faces of the die block sections forming a channel, a die fitting within the channel and having a sliding bearing against the opposing faces of the die block sections, means for adjusting said sections to take up wear between the die and the die block, a recess in the die which registers with the passage in one position thereof, and means to move the die in the channel.

4. In an apparatus for shearing the end of a length of stock, comprising a die block formed in two sections, one of said sections being provided with a passage for the stock, the other section being spaced therefrom and constituting a backing section, the opposing faces of the die block sections forming a channel, means to adjust the backing section relative to the other die block section to take up wear between the faces of the die and die block sections, a die fitting within the channel and having a sliding bearing against the opposing faces of the die block sections, a recess in the die which registers with the passage in one position thereof, and means to move the die in the channel.

5. In an apparatus for shearing the end of a length of stock, comprising a sectional die block, one section thereof having a passage for the stock, the other section constituting a backing section, the opposing faces of the die block sections providing a channel, a movable die in the channel having a sliding fit with the opposing faces of the die block sections, means for adjusting the sections to vary the width of the channel, a recess in the die to receive the end of the stock when the die is in one position, and an ejector housed within the die and actuated by the movement of the die to eject the severed end of the stock.

6. In an apparatus for shearing the end of a length of stock, comprising a sectional die block, one section thereof having a passage for the stock, the other section constituting a backing section, the opposing faces of the die block providing a channel, means for adjusting the width of the channel, a movable die having a sliding fit with the opposing faces of the die block, a recess in the die to receive the end of the stock when the die is in one position, an ejector housed within the die and having a knob projecting therefrom, and a formation on the backing section to strike the knob and eject the severed end of the stock when the die is moved to another position.

7. In an apparatus for the purposes set forth, a die block comprising two spaced portions providing a channel therebetween, one of the die block portions having a passage for the stock, a die comprising two sections confined in the channel, one of said die sections having a recess to receive the end of the stock, the other die section having an ejector movable by contact with the face of the second die block section to eject the finished piece from the die, said die sections being adjustable to vary the width of the die, and means to move the die in the channel.

8. In a machine for the purposes set forth, comprising a die block having a channel, a sectional die having an adjusting means between its sections and movable in the channel, one section of the die having a recess to receive the end of the stock and the other section having an ejector in alignment with the recess, and means to move the die in the channel and actuate the ejector.

9. In a machine for the purposes set forth, comprising a die composed of two sections, said sections being adjustable to vary the width of the die, and dowels to connect the sections, one of the sections having a recess to receive the end of the stock, the other section having an ejector in register with the recess.

10. In a shearing mechanism for shearing segments of tubular stock, a stationary shearing die having inner and outer tube contacting members, a movable shearing die in registry with said stationary die in one position and also having inner and outer tube contacting members, means to feed stock into said stationary and movable shearing dies, a press plunger for moving said movable die relative to said stationary die to shear a segment of stock held in said dies, said plunger being out of contact with said movable die during a portion of its stroke whereby said dies are in registry and motionless over an appreciable period during which stock is fed thereinto, and cam means operable by a continued movement of said movable die to eject a sheared segment therefrom.

11. In a shearing mechanism for shearing segments of tubular stock, a press bed, a stationary die holding member fixed to said bed, a stationary die in said last member comprising inner and outer tube contacting members, automatic means continuously to feed tubular stock between the inner and outer parts of said stationary die, a movable die guided in said stationary die holding member and in registry with said stationary die at one end of its movement, said movable die comprising inner and outer tube contacting parts, a press plunger for moving said movable die to cause a shearing movement between said stationary and movable die parts, said plunger being out of contact with said movable die during a portion of its stroke whereby said dies are in registry and motionless during an appreciable portion of the press stroke during which stock is fed thereinto, ejecting means comprising an ejecting ring between the inner and outer portions of the movable die and an ejecting cam follower, an ejecting cam fixed to said stationary die holder adjacent said press bed whereby downward movement of said movable die causes said cam follower to move said ejecting ring and force a sheared segment from the movable die, and means to return said movable die to registry with said stationary die.

MERCER D. WALKLET.